(12) United States Patent
Hickcox

(10) Patent No.: US 9,511,786 B1
(45) Date of Patent: Dec. 6, 2016

(54) UTILITY CART

(71) Applicant: Jeffrey Hickcox, Goshen, OH (US)

(72) Inventor: Jeffrey Hickcox, Goshen, OH (US)

(*) Notice: Subject to any disclaimer, the term of this patent is extended or adjusted under 35 U.S.C. 154(b) by 0 days.

(21) Appl. No.: 14/925,459

(22) Filed: Oct. 28, 2015

(51) Int. Cl.
*B62B 3/10* (2006.01)
*B62B 5/00* (2006.01)
*B62B 3/02* (2006.01)

(52) U.S. Cl.
CPC .............. *B62B 3/108* (2013.01); *B62B 3/02* (2013.01); *B62B 5/0006* (2013.01)

(58) Field of Classification Search
CPC ........... B62B 3/02; B62B 3/108; B62B 5/0006
USPC ............ 280/32.5, 32.6, 35, 79.11, 79.2, 79.3
See application file for complete search history.

(56) References Cited

U.S. PATENT DOCUMENTS

| | | | | | |
|---|---|---|---|---|---|
| 1,429,216 | A * | 9/1922 | Arwine | .................... | B66C 23/48 212/263 |
| 1,832,041 | A * | 11/1931 | Moehler | ............... | B62B 5/0083 248/129 |
| 2,357,165 | A * | 8/1944 | Brady | .................... | F16M 11/42 248/171 |
| 2,772,889 | A * | 12/1956 | Reynolds | ............ | B60B 33/0002 16/30 |
| 2,780,277 | A * | 2/1957 | Ries | .......................... | A47C 1/08 188/5 |
| 3,137,512 | A * | 6/1964 | Carpezzi | ............... | B62B 5/0083 108/146 |
| 3,184,205 | A * | 5/1965 | Carpezzi | ................... | B66F 1/06 248/352 |
| 3,306,624 | A * | 2/1967 | Goss | ....................... | B62B 1/268 280/47.24 |
| 3,593,954 | A * | 7/1971 | Ritchie | .................. | A47C 7/004 248/215 |
| 3,661,268 | A * | 5/1972 | Boley | ................. | A47G 25/1464 211/49.1 |
| 3,711,054 | A * | 1/1973 | Bauer | ...................... | A47C 3/30 248/161 |
| 4,441,710 | A * | 4/1984 | Lay | .......................... | A61G 5/00 473/56 |
| 4,632,410 | A * | 12/1986 | Bainbridge | .............. | B25H 3/00 280/32.5 |
| 4,657,267 | A * | 4/1987 | Jaumann | ................ | F16M 11/42 248/170 |
| 4,727,958 | A * | 3/1988 | Botello | .................... | B25H 5/00 182/116 |
| 4,807,712 | A * | 2/1989 | Skottegard | ................ | A61F 4/00 180/19.1 |
| 4,867,273 | A * | 9/1989 | Schaevitz | ................ | B25H 5/00 182/116 |
| D326,969 | S * | 6/1992 | Eason | ......................... | D14/224 |
| 5,120,072 | A * | 6/1992 | Laramie | ................. | B62B 3/108 280/47.17 |

(Continued)

*Primary Examiner* — J. Allen Shriver, II
*Assistant Examiner* — Jacob Meyer
(74) *Attorney, Agent, or Firm* — Neal O. Willmann

(57) ABSTRACT

Disclosed herein is a utility cart specifically designed for the support and transport of large planar items. The cart essentially features a platform with a defined perimeter and top and bottom sides. The platform supports a centrally positioned, vertically adjustable post having a cap attached to the distal end of the post for positioning and supporting the planar items being transported. Cart mobility is provided by a plurality of wheels attached to the bottom side of the platform.

8 Claims, 6 Drawing Sheets

(56) References Cited

U.S. PATENT DOCUMENTS

| | | | | |
|---|---|---|---|---|
| 5,377,943 A * | 1/1995 | Perl | A47C 7/004 | |
| | | | 248/157 | |
| D361,587 S * | 8/1995 | Chapman | D16/242 | |
| 5,454,571 A * | 10/1995 | Morrison | A63B 67/00 | |
| | | | 273/407 | |
| 5,460,392 A * | 10/1995 | Hansen | B25H 5/00 | |
| | | | 280/32.5 | |
| D381,821 S * | 8/1997 | Miles | D6/349 | |
| 5,660,637 A * | 8/1997 | Dodge | B05B 13/0285 | |
| | | | 118/500 | |
| 5,772,162 A * | 6/1998 | Lin | A61M 5/1415 | |
| | | | 248/121 | |
| 5,899,297 A * | 5/1999 | Clark | B25H 5/00 | |
| | | | 182/222 | |
| 6,032,966 A * | 3/2000 | Young | B62B 3/108 | |
| | | | 280/47.34 | |
| 6,053,516 A * | 4/2000 | Ottaway | B62B 1/264 | |
| | | | 280/47.24 | |
| 6,182,583 B1 * | 2/2001 | Larson | A47B 9/10 | |
| | | | 108/147 | |
| 6,217,045 B1 * | 4/2001 | Leyton | B62B 3/108 | |
| | | | 280/47.27 | |
| 6,250,655 B1 * | 6/2001 | Sheeks | B62B 1/268 | |
| | | | 280/47.18 | |
| 6,505,844 B2 * | 1/2003 | Hallman | B62B 3/108 | |
| | | | 118/500 | |
| 6,637,761 B1 * | 10/2003 | Boettcher | B62B 1/12 | |
| | | | 280/47.24 | |
| 6,719,308 B2 * | 4/2004 | Parker | B62B 3/10 | |
| | | | 280/47.34 | |
| 6,729,632 B2 * | 5/2004 | Ferrigan | B62B 3/02 | |
| | | | 248/129 | |
| 6,883,439 B1 * | 4/2005 | Moore | A47B 19/06 | |
| | | | 108/147 | |
| 6,896,273 B2 * | 5/2005 | Forsberg | B62B 3/022 | |
| | | | 182/20 | |
| 7,008,165 B1 * | 3/2006 | Grimes | B62B 3/108 | |
| | | | 269/17 | |
| 7,036,669 B1 * | 5/2006 | Brown | B62B 3/10 | |
| | | | 211/85.15 | |
| 7,048,258 B1 * | 5/2006 | Dromgool | B62B 3/108 | |
| | | | 254/332 | |
| D531,419 S * | 11/2006 | Whiteside | D6/352 | |
| 7,347,428 B2 * | 3/2008 | Edenso | A01G 9/02 | |
| | | | 135/15.1 | |
| 7,513,479 B2 * | 4/2009 | Li | E04H 12/2238 | |
| | | | 135/16 | |
| 7,584,973 B2 * | 9/2009 | Brager | B25H 3/026 | |
| | | | 108/141 | |
| 7,588,254 B2 * | 9/2009 | Anthony | A63B 55/00 | |
| | | | 206/315.1 | |
| 7,624,953 B2 * | 12/2009 | Silverman | A61M 5/1415 | |
| | | | 248/125.1 | |
| D618,467 S * | 6/2010 | Hung | D6/335 | |
| 7,731,136 B1 * | 6/2010 | Chisolm | A61M 5/1415 | |
| | | | 211/204 | |
| 7,780,389 B1 * | 8/2010 | Young | B62B 3/022 | |
| | | | 280/43.22 | |
| D627,063 S * | 11/2010 | West | D24/128 | |
| 7,896,298 B2 * | 3/2011 | Meyers | A61M 5/1415 | |
| | | | 248/124.1 | |
| 7,922,134 B2 * | 4/2011 | Gasser | A47C 7/004 | |
| | | | 16/31 A | |
| 8,002,291 B1 * | 8/2011 | Sandoval | B62B 1/268 | |
| | | | 280/205 | |
| 8,177,297 B2 * | 5/2012 | Powell | A47D 1/004 | |
| | | | 297/148 | |
| 8,613,454 B2 * | 12/2013 | Foley | A47B 23/046 | |
| | | | 108/147 | |
| 8,672,287 B2 * | 3/2014 | Li | E04H 12/2246 | |
| | | | 135/16 | |
| 8,844,947 B1 * | 9/2014 | Whiteside | B25H 5/00 | |
| | | | 280/32.6 | |
| 8,876,130 B2 * | 11/2014 | Cummins | B62B 3/12 | |
| | | | 280/79.5 | |
| 8,973,926 B1 * | 3/2015 | Lensing | A47C 9/00 | |
| | | | 280/32.5 | |
| D732,817 S * | 6/2015 | Elstow | D3/10 | |
| 9,079,600 B2 * | 7/2015 | Houlihan | B62B 3/008 | |
| 2002/0043595 A1 * | 4/2002 | Bridgers | A61M 16/08 | |
| | | | 248/125.8 | |
| 2004/0195789 A1 * | 10/2004 | Christensen | F16M 11/18 | |
| | | | 280/35 | |
| 2005/0189005 A1 * | 9/2005 | Smith | G09F 23/00 | |
| | | | 135/16 | |
| 2007/0063471 A1 * | 3/2007 | Carlei | B62B 3/108 | |
| | | | 280/79.7 | |
| 2007/0202292 A1 * | 8/2007 | Van Der Roest | B62B 5/0006 | |
| | | | 428/66.6 | |
| 2010/0038947 A1 * | 2/2010 | Sanchez | A47C 7/402 | |
| | | | 297/354.12 | |
| 2010/0171345 A1 * | 7/2010 | Powell | A47D 1/008 | |
| | | | 297/174 R | |
| 2011/0254240 A1 * | 10/2011 | Hurt | A47C 7/006 | |
| | | | 280/32.5 | |
| 2011/0278809 A1 * | 11/2011 | Turner | A61H 3/04 | |
| | | | 280/47.35 | |
| 2012/0217710 A1 * | 8/2012 | Houlihan | B62B 3/008 | |
| | | | 280/35 | |
| 2013/0154213 A1 * | 6/2013 | Marquez-Molina | A47F 13/085 | |
| | | | 280/35 | |
| 2014/0138925 A1 * | 5/2014 | Ono | B62B 3/02 | |
| | | | 280/35 | |
| 2014/0265253 A1 * | 9/2014 | Ingrasci | B62B 3/02 | |
| | | | 280/638 | |

* cited by examiner

UTILITY CART

FIELD OF THE INVENTION

The invention described herein relates to a utility cart designed and constructed to support and transport planar items, and in particular, large planar items that could not, or only with great difficulty, be transported by hand.

DESCRIPTION OF THE PRIOR ART

The prior art is replete with carts and transport devices described as useful for the transport of large planar items. Typical and perhaps most relevant is the apparatus described by Dromgool et al. in U.S. Pat. No. 7,048,258, which issued May 23, 2006. This document describes an apparatus for lifting and moving objects wherein the apparatus includes a mobile base, a telescoping post, an object handling cradle and a cradle adjusting means. In particular, the telescoping post is attached to the mobile base. The post is vertically disposed and height adjustable. The cradle adjusting means is pivotally attached to the top of the post and allows the attached cradle to be rotatable in a horizontal plane.

SUMMARY OF THE INVENTION

Notwithstanding the similar purpose and features of the apparatus described by Dromgool et al., and the multitude of others described in the prior art, there remains a need for a relatively simple, inexpensive cart for the support and transport of materials, especially large planar items. The cart described and claimed herein features a platform having a perimeter with top and bottom sides. Attached to and extending perpendicularly from the top surface of the platform is a post, adjustable for height. Attached to the top or distal end of the adjustable post is a cap to provide a pivot point on which large planar items are positioned, balanced and supported. A plurality of wheels attached to the bottom surface of the platform provides mobility for the cart and enables the load, balanced on the cap on the distal end of the post, to be transported.

DESCRIPTION OF THE PREFERRED EMBODIMENTS

Figure 1:
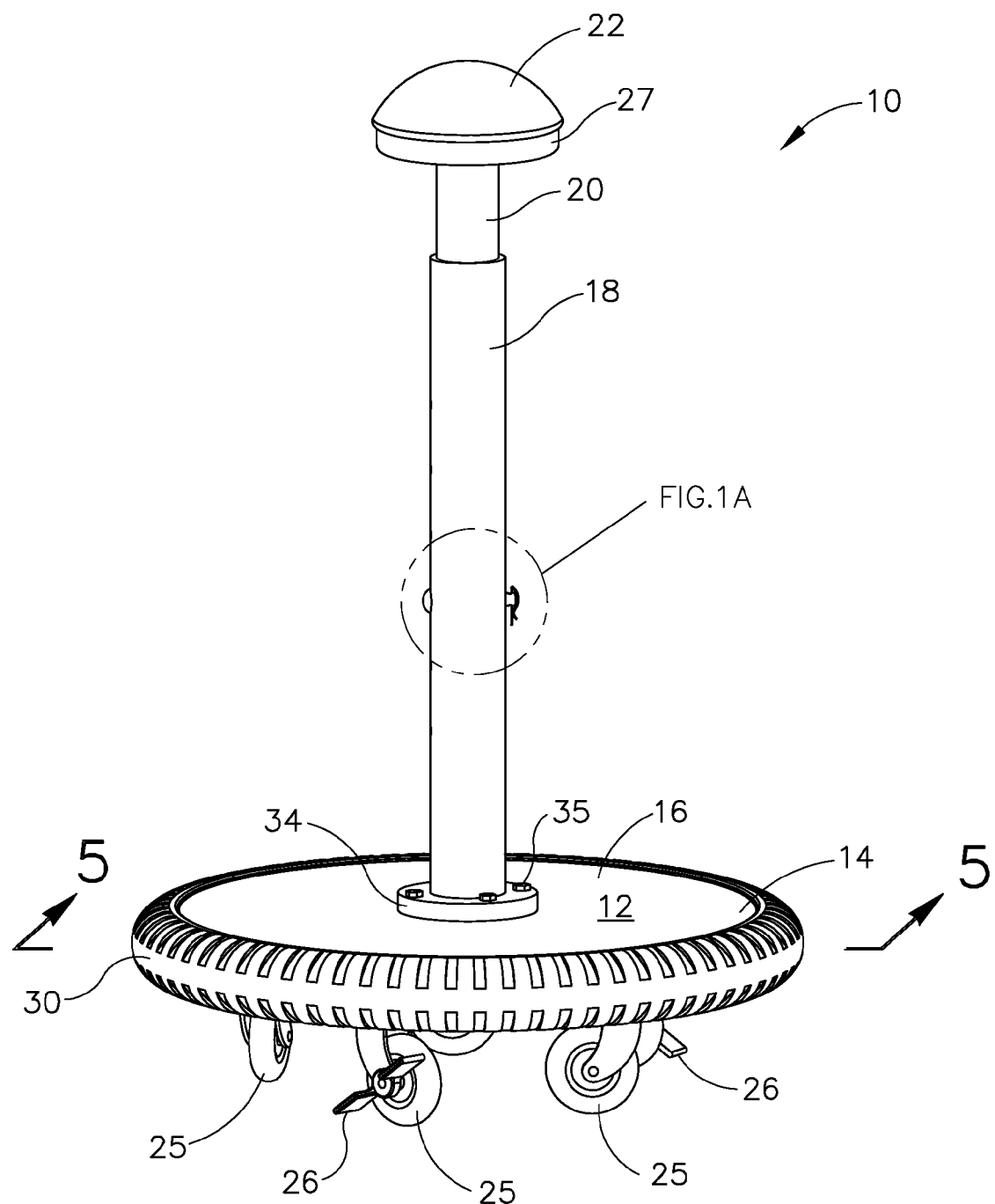
FIG. 1 is a slightly elevated perspective view of the disclosed utility cart.

The disclosed cart 10 and its features can be fully appreciated by referring to the drawing. FIG. 1, a slightly elevated perspective view, is a depiction of all the essential elements of the disclosed cart 10. In its essence, the cart 10 comprises a wheeled 25 platform 12 supporting a centrally positioned, adjustable post 18 and 20 having a cap 22 for the pivotal support of large planar items. Once supported on the cap 22 of the cart, the planar items can be easily transported by simply grasping the supported item and pushing or pulling in the desired direction.

The platform 12 element of the cart 10 has a top side 16, bottom side 17 and a perimeter 14. In the current embodiment of the cart, the perimeter is fitted with a form-hugging, bumper 30, which is preferably resilient to minimize damage to the platform 12 and to articles accidentally encountered while using the cart.

Figure 1A:
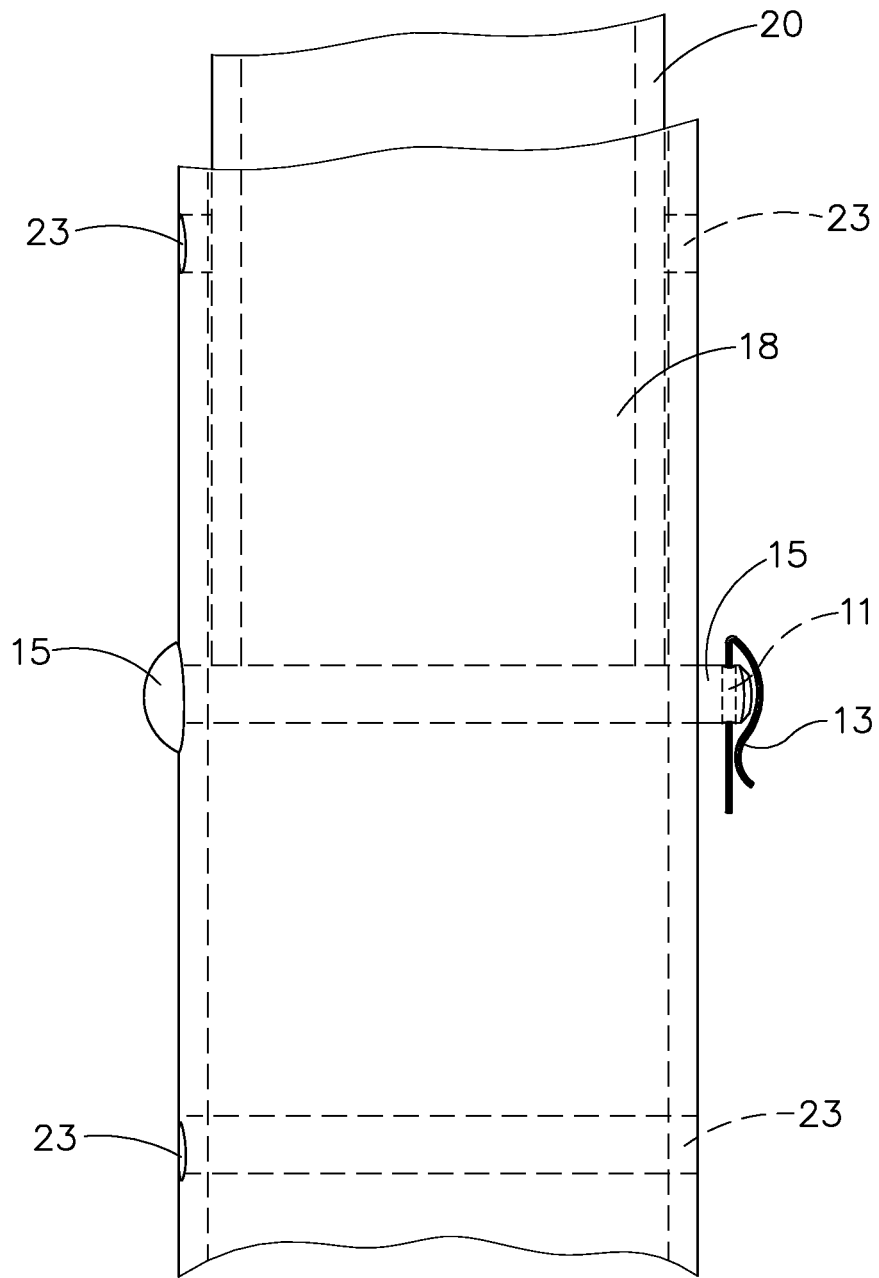
FIG. 1A is an enlarged cross-sectional view of the portion of the post isolated in FIG. 1 depicting a transverse pin securing a predetermined height for the post.
Figure 2:
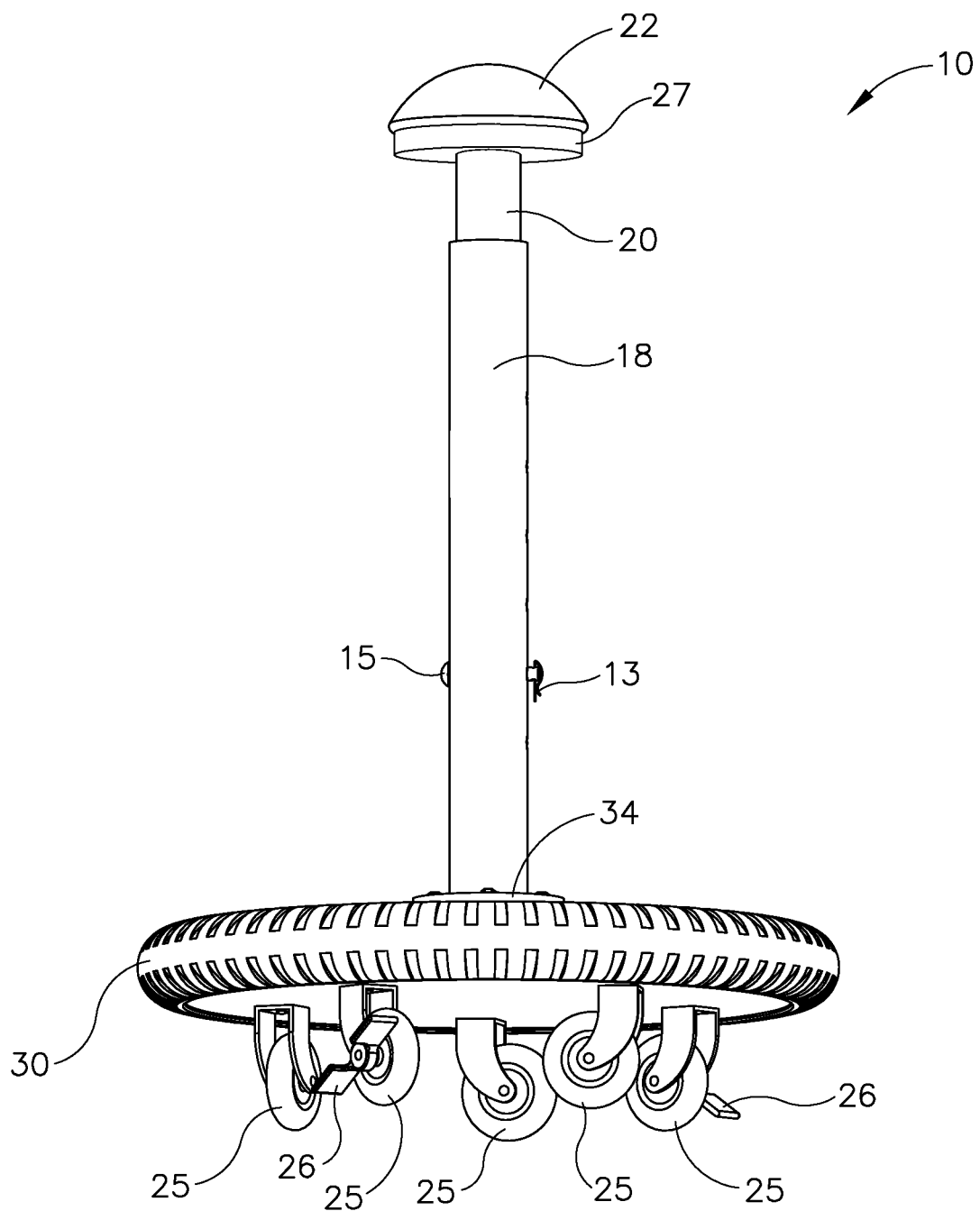
FIG. 2 is a perspective view of the cart from the bottom.
Figure 3:
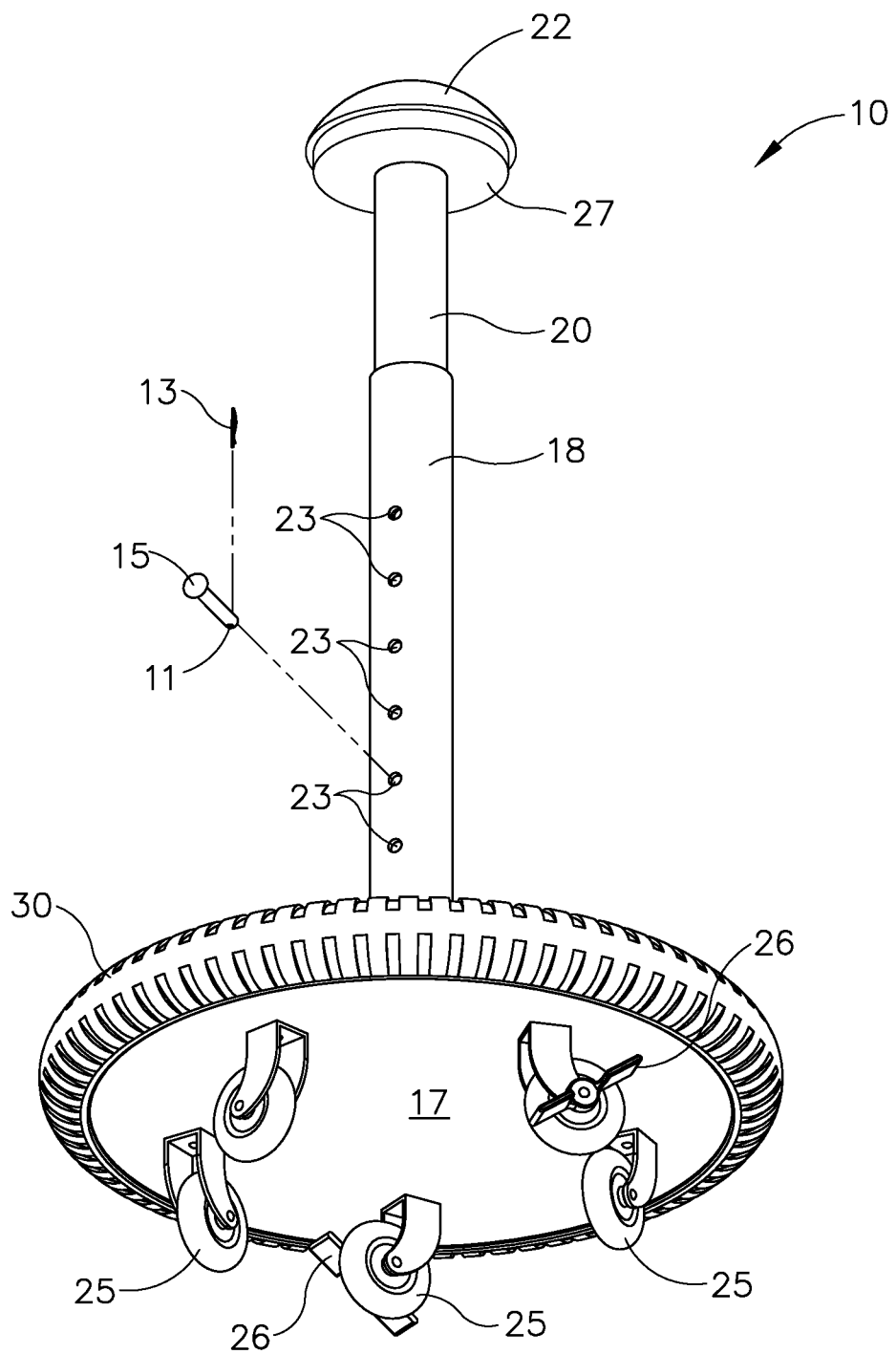
FIG. 3 is a perspective view of the cart from the bottom with the inner post extended.

Positioned centrally and attached to the platform 12 is the adjustable post 18 and 20. To facilitate adjustability, post 18 envelopes the inner post 20. Referring to FIG. 3, it is apparent that the outer post features a plurality of height adjustment holes 23. By referring to FIG. 1A, it is readily apparent that the height adjustment for posts 18 and 20 is effected by vertically extending inner post 20 to the desired height, aligning the diametric holes 23 in post 18 and inserting height adjustment pin 15 through the aligned holes. The proximal end of inner post 20 can then rest on pin 15 and be free to rotate as needed. The rotation of inner post 20 permits the rotation of attached cap 22, which, in turn, enhances the maneuverability of the cart 10 and its planar load. The height adjustment pin 15 is secured by inserting a split pin locking means 13 through hole 11 in the distal end of the adjustment pin 15. The methods and means of height adjustment are conventional and a variety of other methods and means could be employed to effect the same or similar purposes.

Figure 4:
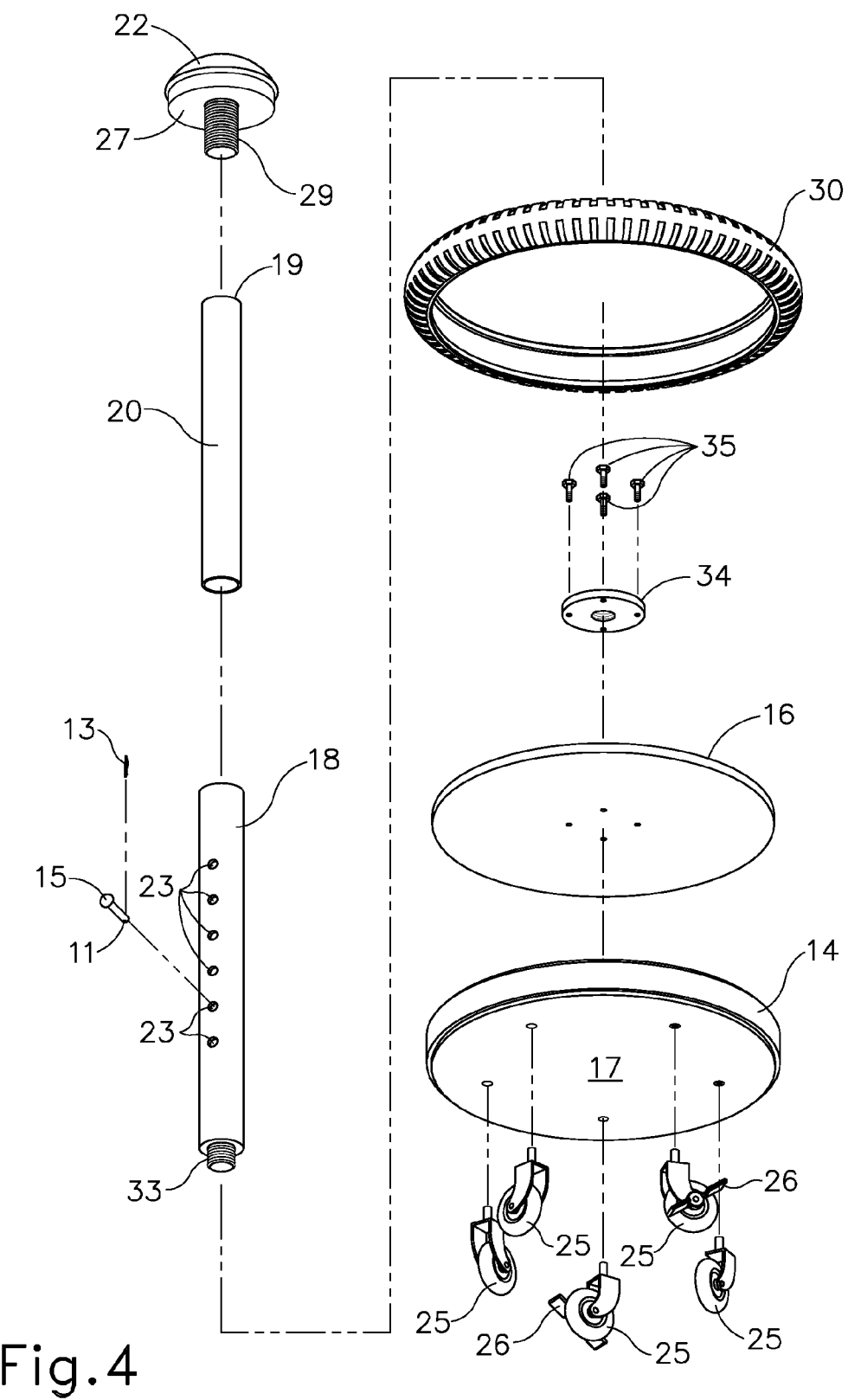
FIG. 4 is an exploded view showing all of the elements of the cart.

Currently, the post 18 is secured to the platform 12 by attaching threaded flange 34 to the central top side or surface 16 of the platform 12 with conventional fasteners 35 and mating a threaded proximal end 33 of post 18 with the threaded flange 34. The exploded view of FIG. 4 illustrates how the threaded flange 34 is centrally positioned and attached to the top side 16 of the platform 12 with a plurality of conventional fasteners 35. The threaded proximal end 33 of post 18 encounters and threadably mates with the threaded flange 34 and is thereby secured to the platform 12.

While continuing to refer to FIGS. 3 and 4, it is easy to appreciate the placement and attachment of the wheeled 25 elements of the cart 10. Clearly, a plurality of wheels 25 is an essential feature of the claimed cart 10. Currently, the purposes of the cart 10 are best served by attaching conventional wheeled castors 25 to the bottom side 17 of the platform 12. Preferably, the wheeled castors are equipped with a locking mechanism 26 that prevents or at least discourages any axial rotation.

Figure 5:
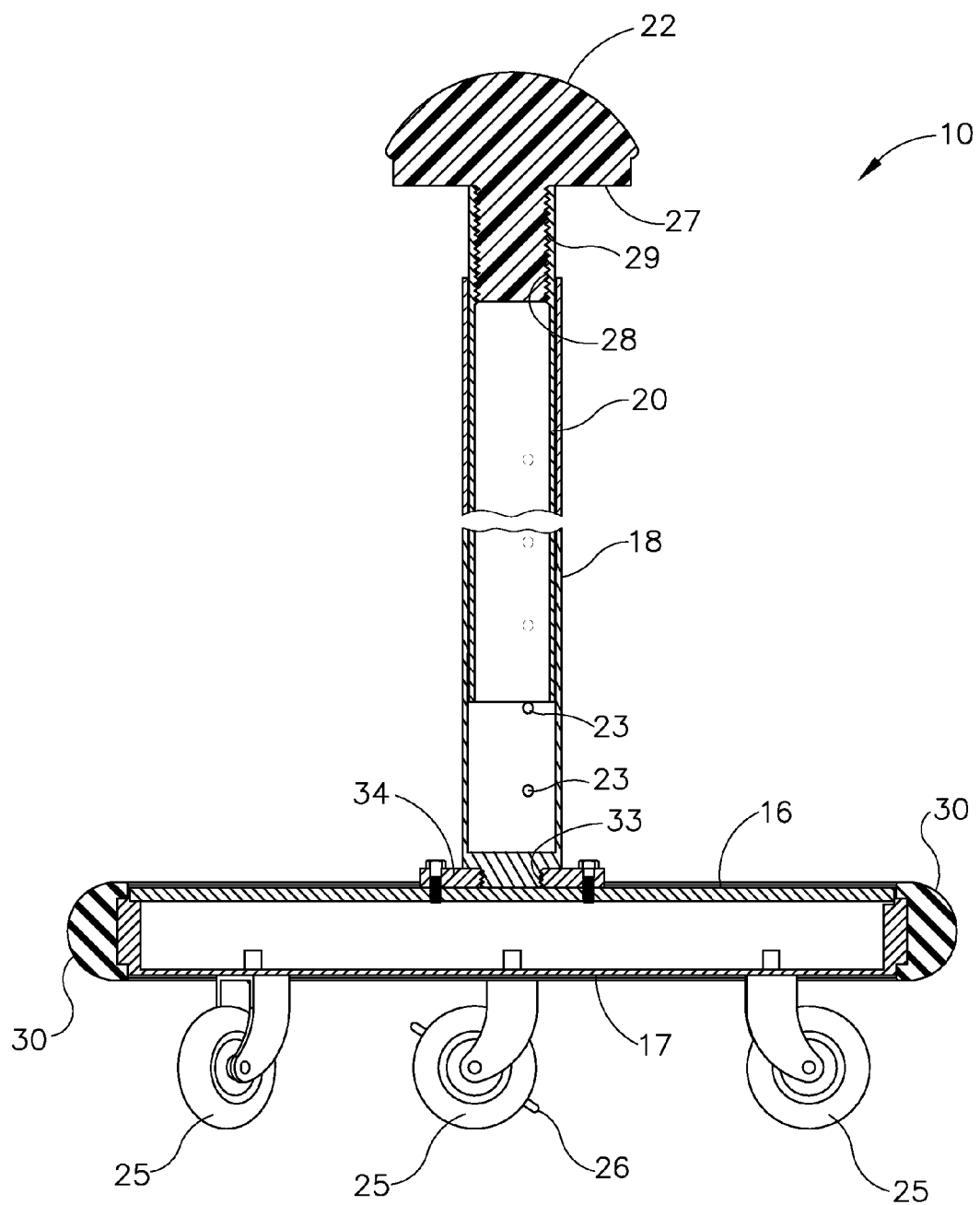
FIG. 5 is a cross-sectional view of the cart taken along line 5-5 of FIG. 1.

The cap 22 element of the cart 10 is positioned and attached to the distal end of inner post 20. Cap 22 is essentially a cushioned dome 22 supported by a cap housing 27, which features a threaded extension 29. The threaded extension 29 inserts into the inner distal end of inner post 20 and mates with internal threads 28 in the distal end 19 of inner post 20. This mating and attachment is readily apparent from the cross-sectional view provided by FIG. 5. The threading between the threaded extension 29 and internal threads 28 in post 20 not only permit attachment of the cap 22 to inner post 20, but it also permits fine height adjustment that is simply not afforded by the interaction of the height adjustment pin 15 and the plurality of adjustment holes 23.

Currently, the cart 10 is fabricated from conventional and readily obtained materials. The platform 12 is preferably constructed from a combination of wood, plastic and laminates and the wheels 25, are purchased from a variety of vendors. The bumper 30 is a treaded tire purchased in diameters to fit the circular perimeter 14 of the platform 12.

The inner and outer posts 20 and 18 are tooled and fabricated from easily purchased steel tubing.

The cushioned dome of the cap 22 is preferably resilient and textured to increase the resistance or friction between the cap and the planar item being conveyed. A suede or chamois skin currently works well and can be replaced easily when it becomes worn or smooth and loses its adherent properties.

While the foregoing is a detailed and complete description of the preferred embodiments of the disclosed utility cart, it should be apparent that numerous variations and modifications can be made and employed to implement the overall purpose of the disclosed cart without deviating or departing from the spirit of the invention, which is fairly defined by the appended claims.

The invention claimed is:

1. A cart for the support and transport of planar items which comprises:
    a platform having a perimeter and top and bottom sides;
    an adjustable post, having proximal and distal ends, centrally positioned and proximally attached to the top surface of said platform and extending distally and perpendicularly from said top surface, said post comprising an outer post and an inner post, said outer post attached to the top surface at a proximal end thereof and having a plurality of height adjustment holes between the proximal end and a distal end thereof, said inner post slidably and rotatably received within the distal end, wherein inserting a height adjustment pin through at least one of said holes provides a support upon which a proximal end of the inner post rests and freely rotates;
    a cap having a cushioned dome on which said planar items are positioned, balanced and supported for transport, said cap supported by a cap housing having a threaded extension protruding from the bottom side thereof inserted into a threaded inner distal end of said inner post and configured to permit fine height adjustment; and
    a plurality of wheels attached to the bottom side of said platform.

2. The cart according to claim 1 wherein the plurality of attached wheels is at least three.

3. The cart according to claim 1 wherein the plurality of attached wheels is four.

4. The cart according to claim 1 wherein the plurality of attached wheels is five.

5. The cart according to claim 1 wherein the post is vertically adjustable.

6. The cart according to claim 5 wherein the post includes an extendible inner post.

7. The cart according to claim 1 wherein the perimeter of the platform defines a circle.

8. The cart according to claim 7 wherein said circular perimeter is enveloped by a resilient bumper.

* * * * *